3,325,566
DIPHOSPHASPIRO COMPOUND AND PROCESS OF MAKING SAME
Rudi F. W. Rätz, Hamden, and Arthur D. Bliss, Guilford, Conn., assignors to Olin Mathieson Chemical Corporation, New Haven, Conn., a corporation of Virginia
No Drawing. Filed Apr. 20, 1964, Ser. No. 361,263
7 Claims. (Cl. 260—927)

This invention relates to the preparation of a phosphorus containing spiro compound having the following formula:

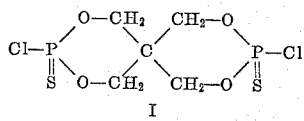

I

The correct chemical name for this compound in accordance with Chemical Abstract's usage is 3,9-dichloro-2,4,8,10 - tetraoxa - 3,9 - diphosphaspiro[5.5]undecane-3,9-disulfide.

The corresponding 3,9-dioxide has been prepared by the reaction of pentaerythritol with phosphoryl chloride. However, attempts to prepare the disulfide (I) by the reaction of pentaerythritol with thiophosphoryl chloride were not successful, since surprisingly a bicyclic primary alcohol is instead obtained.

3,9 - dichloro - 2,4,8,10 - tetraoxa - 3,9 - diphosphaspiro [5.5]undecane, prepared by the reaction of pentaerythritol with phosphorus trichloride, has the formula:

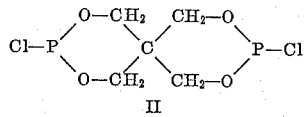

II

Attempts to convert (II) to the desired disulfide (I) by reaction with elemental sulfur gave none of the desired product even under vigorous reaction conditions.

Pentaerythritol bis-hydrogen thiophosphite having the following formula is also known.

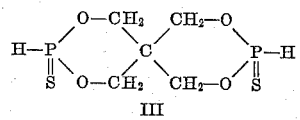

III

It is prepared by the reaction of 3,9-dichloro-2,4,8,10-tetraoxa-3,9-diphosphaspiro[5.5]undecane with hydrogen sulfide in selected solvents as disclosed in copending U.S. patent application, Ser. No. 251,039, filed Jan. 14, 1963, now U.S. Patent 3,210,398.

Exhaustive attempts to prepare the disulfide (I) from the above thiophosphite by a variety of procedures were uniformly unsuccessful. For example, treatment of (III) with elemental chlorine even under carefully controlled reaction conditions gave a desulfurized product. Similarly, treatment of (III) with sulfuryl chloride gave no reaction under mild conditions and produced only a yellow gum when heated. Treatment of the bis-hydrogen thiophosphite with N-chlorosuccinimide gave a mixture of a chlorine-free polymeric substance and a yellow gum. Treatment of (III) in suspension in carbon tetrachloride with triethylamine gave no reaction. Also, treatment of the bis-hydrogen thiophosphite with sodium ethylate and p-toluenesulfonyl chloride gave only pentaerythritol and O,O-diethyl thiophosphorochloridate. In summary then, the preparation of the disulfide (I) has not heretofore been possible.

Therefore, the principal object of this invention is to prepare the aforementioned disulfide. Another object of this invention is to provide a convenient process for the preparation of high purity disulfide in good yield.

These objects have been accomplished in accordance with this invention. It has been found that pentaerythritol bis-hydrogen thiophosphite can be reacted with carbon tetrachloride under selected experimental conditions to provide the disulfide (I) in high yield and purity. The process disclosed herein proceeds in accordance with the following equation.

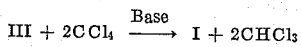

It is necessary to employ a basic catalyst in the preparation of the disulfide, and a catalytic amount of a wide variety of organic bases may be utilized in this respect. Tertiary amines are particularly useful catalysts in the process of this invention and are preferred catalysts. Suitable catalysts which can be used include the trialkyl amines, i.e., triethyl amine, pyridine, N-lower alkyl morpholines, and the like. In general because of their availability, it is preferred to utilize tertiary amines having less than thirteen carbon atoms as the required catalyst. The amount of catalyst employed may vary depending upon the reaction rate desired, but generally about 0.5 to about 5 percent by weight of the catalyst based on weight of thiophosphite can be advantageously used. In fact, even more can be used but the reaction becomes very vigorous, and cooling problems are presented, especially with larger amounts of reactants.

Selected solvents must also be employed in the reaction described herein in order to obtain the disulfide (I). It is thus necessary to utilize an aliphatic carboxylic acid N,N-dialkyl amide solvent in the process of this invention. Particularly useful solvents are the lower alkyl substituted derivatives of formamide and acetamide, and in this respect, dimethylformamide and dimethylacetamide are the preferred solvents for use in this process.

The disulfide (I) may be prepared at temperatures as high as the boiling point of carbon tetrachloride if desired. However, higher yields of the product are obtained at reaction temperatures less than about 40° C. Even more preferably, a reaction temperature range of about −10° C. to about 10° C. should be used in the process described herein.

Upon completion of the chlorination procedure, the disulfide can be readily isolated. For example, the addition of various liquids such as petroleum ether, water, etc., to the reaction solution causes the solid disulfide to precipitate from solution. The substituted amides can also be removed in vacuo from the reaction mixture leaving the residual disulfide which can be recrystallized by conventional procedures.

The following example will serve to illustrate the preparation of the disulfide (I) in accordance with the process of this invention.

Example 1

A 50 ml. Erlenmeyer flask was charged with 1.30 g. (0.005 mole) of pentaerythritol bis-hydrogen thiophosphite. The solid was dissolved in 20 ml. of anhydrous N,N-dimethylacetamide and to the solution was added 5.0 ml. of carbon tetrachloride. The solution was stirred and cooled to 0° C. by means of an ice bath. The vigorously stirred solution was then treated with 0.1 ml. of triethylamine. An exothermic reaction occurred and after a few minutes a white crystalline precipitate appeared. An additional 10 ml. of N,N-dimethylacetamide was added to thin the mixture and stirring was continued for one hour at 0° C. The mixture was then allowed to warm gradually to room temperature, whereupon the solid dissolved. The solution was then allowed to stand for one hour. The addition of 20 ml. of petroleum ether (30–60° C.) and chilling in a freezer produced 1.0 g. of white needles which melted at 183°–184° C. Evaporation of the petroleum ether from the filtrate and the addition of water to the residual N,N-dimethylacetamide solution gave an additional 0.60 g. of white solid, which turned yellow at 165° C. and melted at 173°–177° C. Both samples of solid were recrystallized separately from a mixture of ether and petroleum ether, yielding 1.1 g. of white needles melting at 192°–193° C. The following analytical data revealed that 3,9-dichloro-2,4,8,10-tetraoxa-3,9-diphosphaspiro[5.5]undecane-3,9-disulfide had been obtained. Yield: 68%.

*Analysis.*—Calcd. for $C_5H_8Cl_2O_4P_2S_2$: C, 18.24; H, 2.45; Cl, 21.6; P, 18.82; S, 19.49. Found: C, 18.25; H, 2.49: Cl, 21.8; P, 18.90; S, 19.47.

The disulfide is a useful intermediate in the preparation of a variety of valuable derivatives. For example, it can be reacted with an alkali metal thiocyanate in accordance with the process disclosed in U.S. Patent 3,090,800 to provide a bifunctional isothiocyanate useful as an agricultural chemical, particularly as a herbicide.

The disulfide also readily reacts with ethylenimine and its homologs to provide a series of aziridine derivatives having special utility as insect sterilants. These reactions proceed at temperatures from about 0° C. to 100° C. in the presence of an inert organic diluent such as ether or chloroform.

What is claimed is:
1. 3,9 - dichloro - 2,4,8,10-tetraoxa-3,9-diphosphaspiro[5.5]undecane-3,9-disulfide.
2. A process for preparing 3,9-dichloro-2,4,8,10-tetraoxa-3,9-diphosphaspiro[5.5]undecane-3,9-disulfide which comprises reacting pentaerythritol bis-hydrogen thiophosphite with carbon tetrachloride in an aliphatic carboxylic acid N,N-dialkyl amide solvent, said reaction being performed in the presence of a catalytic amount of a tertiary amine.
3. The process of claim 2 wherein dimethylformamide is employed as the solvent.
4. The process of claim 2 wherein dimethylacetamide is employed as the solvent.
5. A process for preparing 3,9-dichloro-2,4,8,10-tetraoxa-3,9-diphosphaspiro[5.5]undecane-3,9-disulfide which comprises reacting pentaerythritol bis-hydrogen thiophosphite with carbon tetrachloride in an aliphatic carboxylic acid N,N-dialkyl amide solvent, said reaction being performed at a temperature of less than about 40° C. in the presence of a catalytic amount of a tertiary amine having less than 13 carbon atoms.
6. The process of claim 5 wherein dimethylformamide is employed as the solvent.
7. The process of claim 5 wherein dimethylacetamide is employed as the solvent.

No references cited.

CHARLES B. PARKER, *Primary Examiner.*
ANTON H. SUTTO, *Assistant Examiner.*